United States Patent
Haroldsen et al.

[11] Patent Number: 6,030,587
[45] Date of Patent: Feb. 29, 2000

[54] METHOD AND APPARATUS FOR WASTE DESTRUCTION USING SUPERCRITICAL WATER OXIDATION

[76] Inventors: Brent Lowell Haroldsen, 1251 Sprague St., Manteca, Calif. 95336; Benjamin Chiau-pin Wu, 2270 Goldenrod La., San Ramon, Calif. 94583

[21] Appl. No.: 09/076,602

[22] Filed: May 11, 1998

[51] Int. Cl.$^7$ .................................................. G21C 9/00
[52] U.S. Cl. ..................... 422/208; 422/242; 422/119; 422/228; 422/230
[58] Field of Search .................... 422/242, 208, 422/199, 184.1, 295, 230, 228; 588/202, 203; 210/761, 762

[56] References Cited

U.S. PATENT DOCUMENTS

| | | | |
|---|---|---|---|
| 1,440,109 | 12/1922 | Schenck | 422/241 |
| 3,993,450 | 11/1976 | Schora, Jr. et al | 422/146 |
| 4,155,584 | 5/1979 | Sato et al | 210/60 |
| 4,792,408 | 12/1988 | Titmas et al. | 210/747 |
| 5,133,877 | 7/1992 | Rofer et al. | 210/149 |
| 5,405,533 | 4/1995 | Hazlebeck et al. | 210/634 |
| 5,461,648 | 10/1995 | Nauflett et al | 376/305 |
| 5,558,783 | 9/1996 | McGuinness | 210/180 |
| 5,591,415 | 1/1997 | Dassel et al. | 422/241 |
| 5,682,738 | 11/1997 | Barber | 60/39.63 |

*Primary Examiner*—Marian C. Knode
*Assistant Examiner*—Susan Ohorodnik
*Attorney, Agent, or Firm*—Timothy P. Evans

[57] ABSTRACT

The invention relates to an improved apparatus and method for initiating and sustaining an oxidation reaction. A hazardous waste, is introduced into a reaction zone within a pressurized containment vessel. An oxidizer, preferably hydrogen peroxide, is mixed with a carrier fluid, preferably water, and the mixture is heated until the fluid achieves supercritical conditions of temperature and pressure. The heating means comprise cartridge heaters placed in closed-end tubes extending into the center region of the pressure vessel along the reactor longitudinal axis. A cooling jacket surrounds the pressure vessel to remove excess heat at the walls.

Heating and cooling the fluid mixture in this manner creates a limited reaction zone near the center of the pressure vessel by establishing a steady state density gradient in the fluid mixture which gradually forces the fluid to circulate internally. This circulation allows the fluid mixture to oscillate between supercritical and subcritical states as it is heated and cooled.

8 Claims, 3 Drawing Sheets

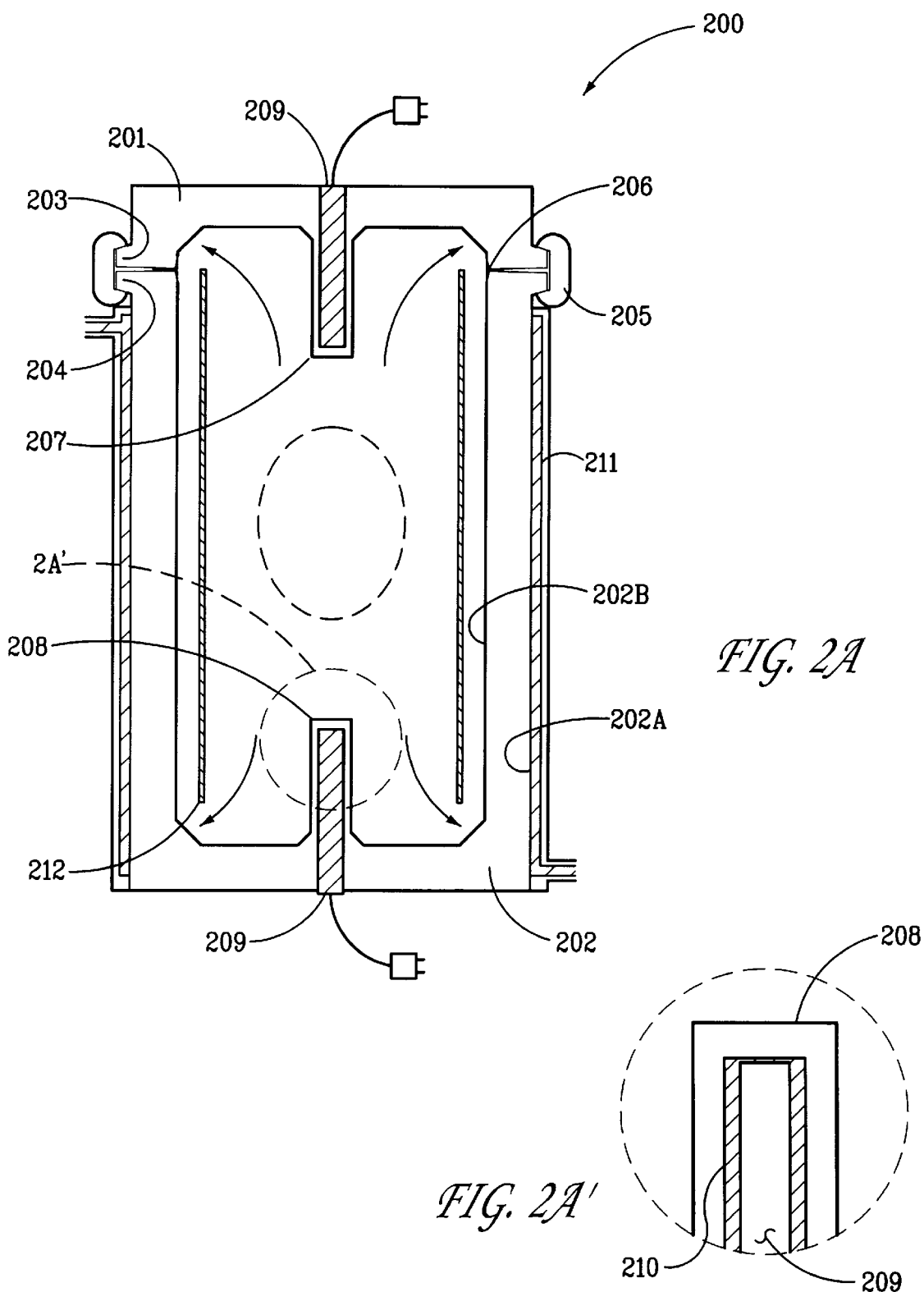

METHOD AND APPARATUS FOR WASTE DESTRUCTION USING SUPERCRITICAL WATER OXIDATION

STATEMENT OF GOVERNMENT INTEREST

This invention was made with Government support under contract no. DE-AC04-94AL85000 awarded by the U.S. Department of Energy to Sandia Corporation.

The Government has certain rights in the invention.

BACKGROUND OF THE INVENTION

This invention is born out of a need for a process to destroy the hazardous wastes, including explosives, fuels, propellants, solvents, and other inorganic and organic materials produced by the military and by industry, without the need for polluting the atmosphere, such as do open burning and open detonation. Also required is a disposal means which does not generate or transform the host materials into other compounds whose safety is either unknown or whose disposal is equally as difficult as the Waste treatment companies around the world are confronting decreasing waste disposal options and accompanying rising costs. For example, sludge ocean dumping in the United States was eliminated in 1988, land filling, and incineration is receiving greater scrutiny due to increasingly stringent state and federal regulations, and public sentiment to reduce pollution such as pathogens, heavy metals, methane gas, and a host of other noxious materials has been on the rise for decades. The disappearance of available land fill sites and the tightening of disposal regulations are driving up disposal costs. Incineration, requiring oxidation of waste at high temperatures with high volumes of air, followed by separation of the effluent gases from the produced ash and the entrained particulate matter, becomes involved, complicated.

Various methods of destroying waste are being employed today to avoid the use of unacceptable disposal techniques. Sludge refuse, for example, is being treated by lime encapsulation, drying and in-vessel composting and similar technologies. New technologies are being developed to destroy waste or at least render the waste safe for disposal. Among those technologies showing promise is supercritical wet oxidation (SCWO).

In recent years, this new method of supercritical water oxidation, has started to be developed. The process achieves substantially complete oxidation of waste by using considerably more compact equipment, thus becoming an excellent candidate for elimination of waste, even on site. Supercritical water oxidation also has the advantage of producing a clean water product suitable for process recycle, thereby facilitating waste minimization Supercritical water oxidation (SCWO) raises the water borne waste to a pressure greater than 3,200 psia, and to temperatures greater than 702° F. Under these conditions, water acts as an excellent solvent for both organic compounds and air. The oxygen in the air oxidizes the organic matter converting them to the harmless inert products of oxidation-carbon dioxide and water. Many researchers have demonstrated the effectiveness and efficiencies of supercritical water oxidation in destroying organic waste demonstrating destruction efficiencies reaching virtually 100%.

The solvent properties of supercritical water are different from those of liquid water in that non-polar lipophilic compounds are soluble and salts are less soluble. The majority of hazardous wastes which it is desired to destroy will be soluble in supercritical water. Because complete mixing is possible in the single-phase supercritical region, reaction kinetics are not diffusion limited. In contrast, in two-phase systems, concentration gradients across phase boundaries limit the extent to which compounds can be destroyed.

It is expected that the supercritical oxidation of the present invention will result in conversion of hazardous materials to relatively benign substances and/or to substances which are easily treatable such that they are rendered fit for ultimate disposal into the environment. The products of the inventive process are expected to be primarily CO, $CO_2$, $H_2O$, $N_2$, $N_2O$, $H_2$, and certain salts. Though oxidation in the medium of supercritical water is similar to combustion, it takes place at lower temperatures than incineration and thus is expected to produce only trace amounts of $NO_x$, thus solving the significant air pollution problem of $NO_x$ emission. Though the process will produce $N_2O$, which is a "greenhouse effect" gas, $N_2O$ is considered to be a much less serious problem than $NO_x$. In addition, $N_2O$ in the atmosphere will not tend to form $NO_x$ but will tend to break down into $N_2$ and $O_2$.

The inventive process is contained and thus its effluents can be completely controlled, in contrast to open burning. Because water is the reaction medium, the process can be used for a variety of wastes containing water or for contaminated water. There appear to be no technological upper or lower limit to the concentrations of waste material which can be destroyed. The process can be applied to difficult problems such as cleaning contaminated soil from a polluted site, destruction of armaments, such as solid fuel in a missile, and various types of radioactive waste.

The prior art is replete with means to implement wet oxidation of wastes. Supercritical oxidation is described in U.S. Pat. Nos. 4,338,199, and 4,543,190, issued both to Modell. U.S. Pat. No. 4,822,497, to Hong et al., discloses high destruction efficiencies and is typical of the supercritical water oxidation designs being commercialized. Most systems described in the literature use either pure oxygen or oxygen in air. Others use liquid oxidant such as hydrogen peroxide as taught by Welch et al in U.S. Pat. No. 4,861,497. U.S. Pat. No 5,133,877, to Rofer et al., describes a process for treating waste without the need for an oxidant material. U.S. Pat. No. 5,591,415, to Dassel, et al. describes a pressure vessel containing a reactor whose walls provide a barrier between the harsh chemical environment in the reactor and the pressure vessel itself.

However, nearly all of the current approaches to applying this method are continuous feed, or steady-state flow reactors. That is, materials are constantly being added to, and removed from, the reactor, in such a way as to avoid buildup of either reactants or products. These types of reactors are large, expensive and complex. They also tend to be fixed facilities due to their size limiting their most effective deployment to only those sites with major cleanup inventories.

What is need therefore is a simpler method for treating much smaller quantities of waste. In particular, a mobile, or semi-mobile, batch reactor is needed for application to widely dispersed or remote waste sites

SUMMARY OF THE INVENTION

The invention relates to an improved reactor apparatus and method for initiating and sustaining reactions, particularly oxidation reactions in an aqueous media.

The invention finds preferable use in the field of supercritical reactor applications, wherein one or more reactants introduced into the reactor's reaction zone of a reactor containing water as a carrier fluid which is heated and pressurized to a supercritical state.

In the preferred embodiment of the invention, the reactants comprise one or more hazardous waste materials and a source of oxygen, with supercritical water employed as a carrier fluid for the oxygen. The hazardous waste is to be reduced or neutralized to harmless by-products by an oxidation-reduction reaction.

It is an object of the present invention to provide a means and method of utilizing supercritical oxidation to permit highly efficient oxidation of waste materials, particularly hazardous wastes such as explosives.

It is another object of the present invention to exploit the reaction conditions of a supercritical reactor to permit system features which dramatically enhance the operating efficiency of a batch reactor.

It is still another object of this invention to provide a means and method of utilizing supercritical oxidation for thoroughly and safely eliminating or neutralizing hazardous waste, and in particular, to eliminate waste explosives, propellants, and some otherwise stable organic polymers.

It is another object of the invention to provide a supercritical oxidation reactor which utilizes supercritical water whose temperature can be controlled, though the use of external heaters, so as to maintain supercritical conditions within a zone generally near the center of the reactor.

It is yet another object of this invention to provide a batch reactor capable of sustaining the extreme temperature and pressures typically encountered with supercritical oxidation reactions while maintaining the reactor wall temperatures much below those of supercritical conditions.

It is another object of the invention to provide a reactor which is small and easily transportable and one which does not require high pressure pumps, compressors, valves, heat exchangers or other process equipment.

BRIEF DESCRIPTION OF THE DRAWINGS

FIG. 2A shows a diagrammatic cross-section of the reactor of the present invention.

FIG. 2A' presents an expanded cross-sectional view showing the placement of the contact layer between the heating cartridge and the inside surface of the lower protuberance of the instant invention.

DETAILED DESCRIPTION OF THE PREFERRED EMBODIMENT

Generally, designs of supercritical water oxidation systems found in the literature are composed of six basic components. The first is a means to pressurize the waste water; the second, an oxidant which is added and mixed with the waste water; the third, is a source of heat, the fourth, a reaction chamber which provides sufficient volume for the reaction to proceed and capable of withstanding the temperatures and pressures encountered during supercritical operation, the fifth, is a pressure letdown means; and the sixth, is a means of effluent cooling.

Figure 1:
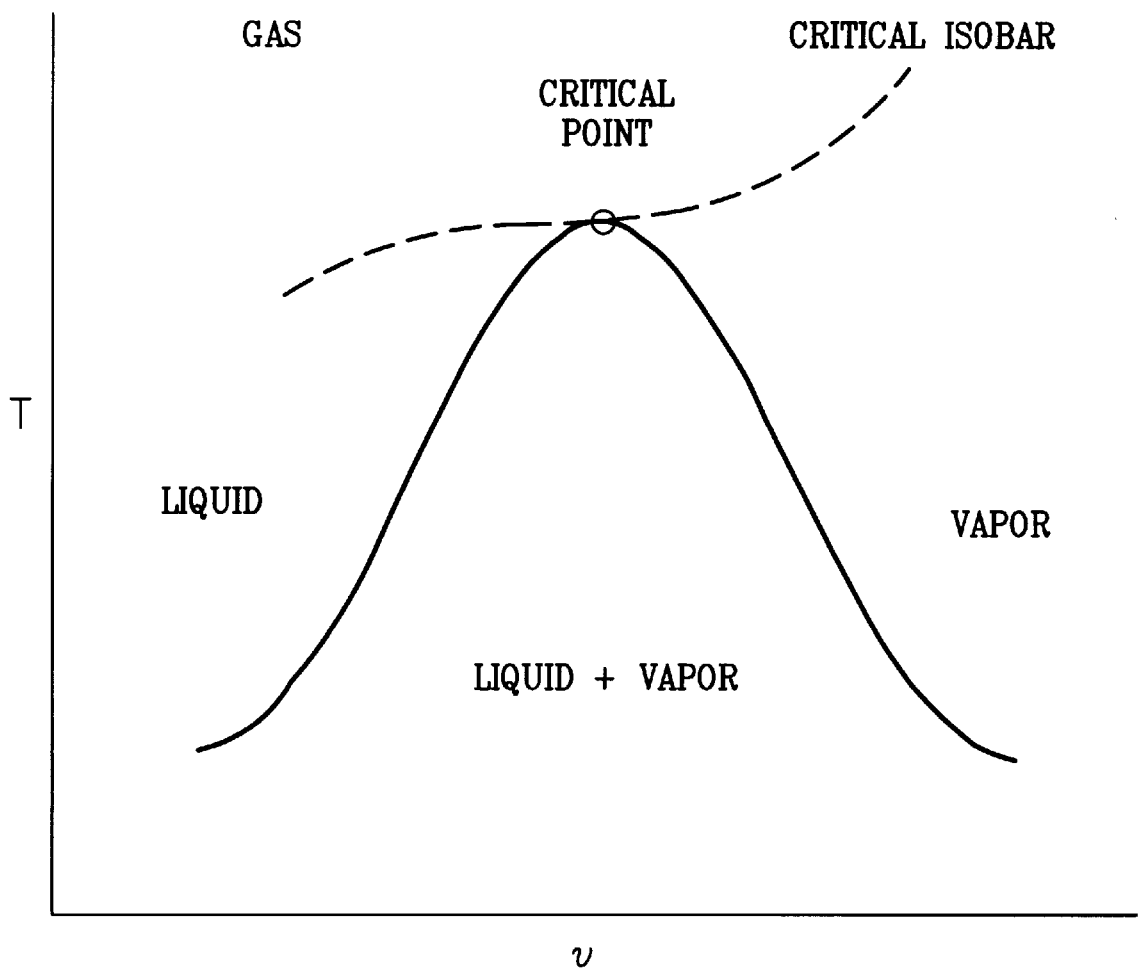
FIG. 1 shows the water liquid/vapor phase diagram and indicating the point of supercritical transition.

In a water liquid/vapor phase diagram, shown in FIG. 1 one may see that there is a critical point of temperature (about 700° F.) and a critical point of pressure (about 3,200 psia) over which there is only one single fluid phase, and which, although represents neither liquid nor vapor, behaves and seems to have more of a vapor character than of a liquid one. The single-phase condition occurring above the critical points is called supercritical condition.

The use of very high pressures at elevated temperatures, however, presents serious challenges in the construction of a reactor capable of withstanding these adverse conditions. In order to meet this situation, excessively elongated reactors having accordingly small diameter have been largely utilized in the past. These conventional reactors, however, exhibit a number of disadvantages which include restrictions on waste feed materials (to preclude corrosive feeds and products of destruction), increased plugging potential due to small diameters, restrictions on feed rates, increased investment cost, and safety hazards. Furthermore, nearly all conventional approaches have been drawn to continuous flow systems. The preferred embodiment of the instant invention avoids these limitations by approaching the problem in an entirely different manner.

Rather than attempting to provide a system based on a continuous flow reactor, a batch reactor has been designed. Furthermore, in order to avoid many of the problems associated with containing a pressurized, supercritical liquid a reactor has been provided which maintains supercritical conditions only within a limited zone near the center of the reactor.

The operational concept of the present invention is as follows: waste is loaded into a reactor vessel and a solution of hydrogen peroxide and water is added. The solution is then heated at which point the hydrogen peroxide decomposes to oxygen and water. Air or oxygen could also serve as the oxidizer, but water is still required as the reaction medium. After the reactor is sealed, the fluid is heated by means of electrical resistance heaters located along the axis of the reactor. As the system heats up, the internal pressure increases until the temperature and pressure of the system reach supercritical conditions near the center of the reactor. Coincidentally, the fluid near the reactor wall is cooled by conduction through the wall to a heat transfer means attached to the exterior of the reactor.

Above the critical pressure of 3204 psia, fluids can be heated and cooled between subcritical and supercritical temperatures with no discontinuity in density. Consequently, the reactor does not have separate liquid and gas phases; the density changes in a continuous gradient from liquid-like conditions in a lower temperature region near the wall to a gas-like supercritical condition at the center of the vessel. At the desired operating conditions, the system reaches an equilibrium in which the fluid continuously circulates through the vessel due to natural convection: the heat input at the center is balanced by the heat loss at the wall. At supercritical conditions, organic wastes and oxygen react spontaneously to form water, carbon dioxide, acids, and salts. As the fluid circulates through the supercritical region in the center of the reactor, all the waste is destroyed. The system is then cooled and the contents of the reactor analyzed to verify that the treated waste has been completely consumed. The reactor is then emptied and prepared for another batch process.

It is worth noting that organic matter decomposes readily under supercritical conditions, and in the presence of oxygen carbonaceous compounds oxidize completely to carbon dioxide, sulfur, compounds mostly to $SO_3$, and nitrogen compounds decompose mostly to molecular nitrogen. It is also worth noting that under supercritical water oxidation conditions, only small amounts of nitrogen oxides are produced.

The invention can be explained most effectively by referring to FIG. 2A.

The reactor of the present invention comprises a conventional pressure vessel 200 fabricated from high strength steel or other structural material member such as alloys of nickel, titanium, aluminum, and the like, and alloys thereof. The vessel 200 further comprises a cap 201 and shell 202. Both the cap 201 and shell 202 have a mating seal ring flange 203 and 204 located at, an running around, the outside edge of each. The seal ring flanges 203 and 204 are used to permit the to two parts of the reactor to be secured together. A series of clamps 205 are provided which are placed at equidistant locations around the perimeter cap/shell assembly ring flanges. The clamps 205 compress the two flanges against a metal compression gasket 206 provided between cap 201 and shell 202 in order to provide a hermetic seal within the closed pressure vessel 200. Clamps 205 are here a Graylok type "c" clamp but may be any convenient device or method. These might include, but not be limited to, nuts and bolts through a plurality of equidistant spaced through holes, hydraulic clamps, or a screw clamp.

In all respects the vessel comprising the reactor is conventional, except that both the cap 201 and shell 202 are provided with hollow, cylindrical protuberances 207 and 208 lying along the central axis and extending deep into the interior of vessel 200. These protuberances are closed to the interior of vessel 200 but open to the surrounding exterior environment. High watt-density heating cartridges 209 are inserted into the protuberances such that the cartridge wall and the exterior wall of the protuberance mate and form a tight fitting seal. The heating cartridge may include a contact layer 210 for providing better conductive contact with the vessels' exterior wall.

Shell 202 is provided with a cooling portion 211, such as a cooling jacket or the like, by circulating a fluid media, preferably water, through an envelop constructed directly on shell 202 and using the exterior wall of shell 202 as one wall of the jacket. Alternatively, cooling portion 211 may be established by attaching a separate manifold around the shell wall 202a and securing it in intimate contact with the wall. Cooling portion 211 is used to maintain shell exterior wall 202a at temperatures substantially below the supercritical temperatures setup in the reactor center zone.

In practice this temperature would range between about 400° F. and 575° F. while the interior of the reactor fluid is expected to temperatures in excess of 1000° F. This temperature difference will provide a large density gradient within the fluid medium and will insure that the fluid circulates throughout the reactor. This circulation promotes rapid oxidation in the hot center zone by constantly moving reactants into this zone while removing reaction products. It also has the added benefit of minimizing corrosion of the interior wall. Such circulation thus helps to maintain the efficiency of the oxidation process.

In addition, an internal baffle 212 or series of baffles in the form of long cylinders spaced slightly away from the shell interior wall 202b may be incorporated in the reactor interior in order to further enhance circulation by nominally isolating the central supercritical zone from the cooler walls. Baffle 212 shields the interior wall from the effects of side circulation eddies and further helps to establish a discrete convective circulation between the wall and the vessel interior. Each baffle is supported by standoff supports to hold it off the interior wall and bottom of the reactor. These supports may be any convenient device or method such as, but not limited to angled supports welded at different heights around the circumference of the interior walls and around the bottom of the vessel. Alternatively the baffle itself may incorporate arms and legs or a series of openings in through it's surface at strategic locations.

Figure 2B:
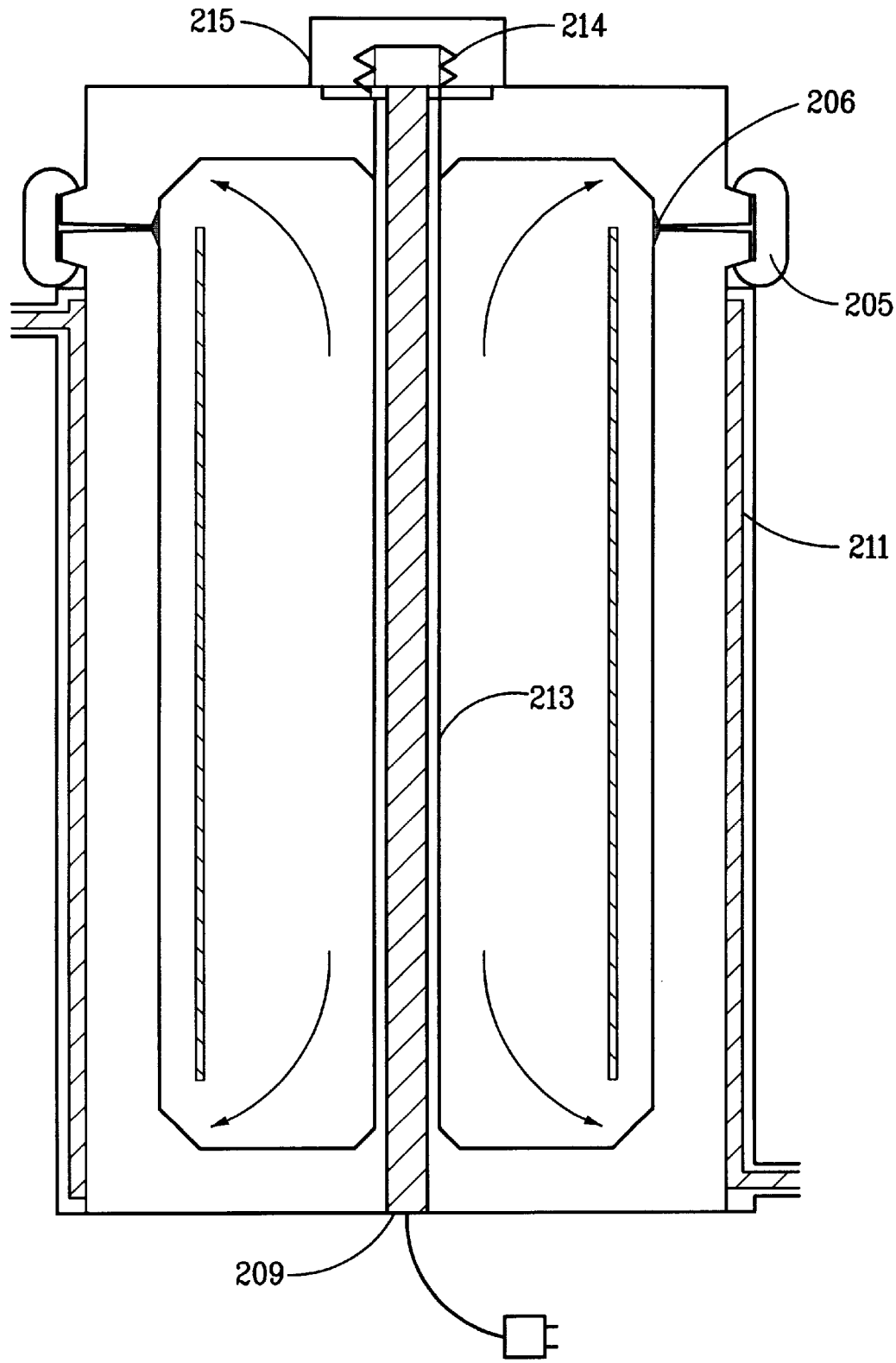
FIG. 2B illustrates a diagrammatic cross-section of an alternate reactor embodiment.

An alternate embodiment shown in FIG. 2B, includes a reactor shell 202 having central hollow tube 213 running the length of the reactor. This tube would be open to the outside environment, but closed to the interior of reaction vessel 200. The tube 213 would be sealed or secured to the cap/shell assembly in any of a number of ways. Any techniques well known to the art may be used for the hermetic connection or sealing including but are not limited to welding, pipe fitting/compression sealing, and the like.

Most preferably, tube 213 would run up, and extend out of a hole fitted with a male nipple 214 welded, or otherwise secured, to the reactor cap 201. The tube 213 would be attached to shell 202 by welding it to a close fitting hole in the shell bottom end. Tube 213 would then be passed through threaded male nipple 214, the nipple having a close fitting inside diameter for passing the tube through, the tube secured by a ferret/gasket means 215. High watt-density heating cartridges 209 again are placed at or near the center of the tube for heating the central zone of the reactor.

In operation, the reactor vessel would be loaded with a quantity of water, the oxidizer added, the waste materials, which are to be destroyed, added, and the vessel sealed. Circulating water would then be admitted through the cooling jacket and the heating elements slowly powered. The internal temperature and pressure of the vessel are closely monitored as the heating elements gradually bring the water inside the reactor achieves a supercritical state. By controlling the rate of heating a cooling, adjusting the current to the heaters and the volume and temperature of cooling water passed over the vessel walls, the desired internal circulation is established. This circulation constantly replenishes reactants into the supercritical region helping the reaction proceed.

Once it has been determined that no further reaction is taking place, power is removed from the center heating elements and the vessel is allowed to cool. The processed and cooled brine is sampled and analyzed for composition and then further treated in order to precipitate and remove any metals in the effluent stream, to neutralize acids and to remove dissolved salts.

It should be pointed out that in the different embodiments of the present invention, oxygen could be replaced by other oxidants or mixtures of oxidants, or mixtures of oxidants and other gases or liquids. It should also pointed out that the is reactors of the present invention are particularly useful in the case of supercritical water conditions, especially in the presence of corrosive compounds, such as for example halogens, and the like.

The examples and the description of the above embodiments have been given for illustrating purposes only and they should not be construed as restricting the scope of the present invention. Features described in one embodiment of this invention may be combined with any appropriate features of other embodiments, or replace features of other embodiments for the purpose of exemplifying the scope of the invention.

What is claimed is:

1. A pressurized reactor for supercritical water oxidation, comprising:
    a pressure vessel for containing a fluid and capable of operating in excess of a supercritical temperature and a supercritical pressure of said fluid, said vessel further comprising a shell and a cap portion, said portions fitting together to enclose an interior space, said portions having interior and exterior surfaces and a common longitudinal axis, said interior space having a center point;
    an oxidizer, said oxidizer mixed with said fluid;
    an electrical heating means;
    a hollow protuberance located in at least one of said portions, said protuberance formed along said common axis and projecting into said interior space, said protuberance having an end closed to said interior surface and an end open to said exterior surface, said protuberance receives said electrical heating means, said electrical heating means heats said fluid in a first zone surrounding said interior center point; and
    means for cooling said vessel exterior surface, thereby cooling said interior surface and creating a second zone in said fluid along said interior surfaces wherein said fluid exists in a subcritical state, said heating means and said cooling means creating a density gradient in said fluid and thereby cause a steady state convective circulation to form in said fluid.

2. The reactor of claim 1, wherein each said portion further comprises:
    an outside perimeter edge, said edge extending completely around said open end, each of said edges further extending into a seal ring flange, each of said flanges located adjacent to said open ends, said flanges configured to mate with each other, said flanges further configured to receive a compression gasket seal therebetween.

3. The reactor of claim 2, wherein said shell portion and said cap portion are connected by a plurality of clamping means to form a hermetic seal, said means arranged equidistant around said perimeter.

4. The reactor of claim 3, wherein said clamping means comprise a C-clamp.

5. The reactor of claim 1, further comprising an internal baffle, said baffle for assisting in separating said first and second zones.

6. The reactor of claim 5, wherein said baffle further comprises standoff supports.

7. The reactor of claim 1, wherein said electrical heating means comprises a resistive heating element.

8. The reactor of claim 1, wherein said electrical heating means includes a contact layer for providing conductive contact with said exterior surface.

* * * * *